United States Patent
Tisch

(10) Patent No.: US 8,581,530 B2
(45) Date of Patent: Nov. 12, 2013

(54) ELECTRONIC SELF-LOCKING DEVICE FOR A WINDSCREEN WIPING DEVICE

(75) Inventor: Florian Tisch, Renchen-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 372 days.

(21) Appl. No.: 12/739,029

(22) PCT Filed: Nov. 12, 2008

(86) PCT No.: PCT/EP2008/065374
§ 371 (c)(1),
(2), (4) Date: Apr. 21, 2010

(87) PCT Pub. No.: WO2009/100785
PCT Pub. Date: Aug. 20, 2009

(65) Prior Publication Data
US 2010/0306948 A1      Dec. 9, 2010

(30) Foreign Application Priority Data

Feb. 14, 2008   (DE) .................... 10 2008 000 298

(51) Int. Cl.
*H02P 7/00*   (2006.01)
*H02P 5/00*   (2006.01)
*H02P 3/00*   (2006.01)

(52) U.S. Cl.
USPC ........... 318/282; 318/443; 318/444; 318/445; 318/483

(58) Field of Classification Search
USPC ...................... 318/282, 443, 444, 445, 483
See application file for complete search history.

(56) References Cited

U.S. PATENT DOCUMENTS

| | | | | |
|---|---|---|---|---|
| 4,431,954 A | * | 2/1984 | Carpenter et al. | 318/443 |
| 4,492,904 A | * | 1/1985 | Graham | 318/444 |
| 5,177,418 A | * | 1/1993 | Muller | 318/265 |
| 5,235,260 A | | 8/1993 | Furukoshi | |
| 5,333,351 A | * | 8/1994 | Sato | 15/250.13 |
| 5,539,269 A | | 7/1996 | Altmann et al. | |
| 6,249,098 B1 | * | 6/2001 | Miyazaki et al. | 318/280 |
| 6,657,410 B1 | * | 12/2003 | Berger et al. | 318/483 |
| 6,696,808 B2 | * | 2/2004 | Schmid et al. | 318/445 |

(Continued)

FOREIGN PATENT DOCUMENTS

JP      2004254455      9/2004
WO      95/31360 A1     11/1995

OTHER PUBLICATIONS

PCT/EP2008/065374 International Search Report.

*Primary Examiner* — Eduardo Colon Santana
*Assistant Examiner* — Gabriel Agared
(74) *Attorney, Agent, or Firm* — Michael Best & Friedrich LLP

(57) ABSTRACT

The invention relates to a windscreen wiping device for a motor vehicle, comprising at least one wiper, a wiper drive (1), an electronic control device (2) that controls the wiper drive (1), a first signal transmitter for capturing the angular position of the wiper, and a first control line (7) that can emit an angle position signal captured by the first signal transmitter to the control device (2). According to the invention, a second signal transmitter for capturing the angular displacement of the wiper is provided. A second control line (8) that can emit an angle modification signal captured by the second signal transmitter to the control device (2) is provided. Said claimed windscreen wiper device has the advantage that it has a permanent self-locking device for at least one wiper.

8 Claims, 2 Drawing Sheets

(56) References Cited

U.S. PATENT DOCUMENTS

| | | | |
|---|---|---|---|
| 6,801,006 B2 * | 10/2004 | Moosmann et al. | 318/444 |
| 7,355,360 B2 * | 4/2008 | Assan | 318/280 |
| 7,895,702 B2 * | 3/2011 | Tisch et al. | 15/250.17 |
| 2002/0003410 A1 * | 1/2002 | Lassle | 318/445 |
| 2005/0242762 A1 * | 11/2005 | Assan | 318/443 |
| 2008/0196190 A1 | 8/2008 | Tisch et al. | |

* cited by examiner

ELECTRONIC SELF-LOCKING DEVICE FOR A WINDSCREEN WIPING DEVICE

BACKGROUND OF THE INVENTION

The invention relates to a windscreen wiping device for a motor vehicle, having at least one wiper, a wiper drive, an electronic control means which actuates the wiper drive, a first signal transmitter for recording the angular position of the wiper, and a first control line which can be used to feed an angular position signal, which is recorded by the first signal transmitter, to the control means.

Windscreen wiping devices are very important in various fields of application, for example in vehicle engineering, and serve, for example, to clean the rear or front windscreen of a motor vehicle, aircraft, boat or a rail vehicle.

Various embodiments of windscreen wiping devices are known from the prior art. Most of said windscreen wiping devices comprise one or more drives. An electric wiper drive, which drives the wiper directly or via a rod, is usually used. One to three wipers are generally used for a windscreen. The wipers are fitted with rubber wiper blades and move over paths which are in the form of a segment of a circle or, in rare cases, also move linearly across the windscreen. Said wipers are intended to keep the view clear in the region covered.

DE 10 2005 050 774 discloses a windscreen wiping device which provides electronically implemented self-locking, so that it is possible to dispense with mechanical self-locking measures in wiper drives. The described windscreen wiping device is further based on the idea that the need for self-locking, specifically preventing the wiper from rotating into the field of view and having an adverse effect on the field of view of the driver, can be met as early as when the wiper is returned so soon after rotation that there is virtually no interference in the viewing conditions. In the case of the described windscreen wiping device, the control means monitors the wiper during the inoperative state of the drive by evaluating the position sensor signals for a change in position. When the position monitoring device responds, the control means actuate the drive in order to return the wiper to a setpoint position.

A development of the described windscreen wiping device provides for the electronic self-locking device, which is naturally assigned to a power supply but, in the process, is intended to preserve the vehicle battery as far as possible, to be active even when the ignition is switched off, for example in a car wash. To this end, the control means is designed as an internally wakeable electronics system which is connected to the vehicle battery when the ignition of the motor vehicle is switched off and is in a standby state when the electronic self-locking device is not active, with the control means cyclically waking itself in the standby state, in each case assuming an operative state with active electronic self-locking for a wake phase, and returning to the standby state. In this way, a change in position of the wiper which occurs beforehand or occurs during the continuous wake phase is counteracted.

This design and other designs which are known from the prior art do not exhibit effective electronic self-locking in the standby state. During the standby state, the wiper arms can be moved from the park position into the wiping field as a result of misuse or other external influences (for example car washes).

SUMMARY OF THE INVENTION

In contrast, the windscreen wiping device according to the invention has the advantage that it provides permanent self-locking for at least one wiper.

According to the invention, this is achieved by a windscreen wiping device for a motor vehicle, having at least one wiper, a wiper drive, an electronic control means which actuates the wiper drive, a first signal transmitter for recording the angular position of the wiper, and a first control line which can be used to feed an angular position signal, which is recorded by the first signal transmitter, to the control means, characterized in that a second signal transmitter is provided for recording a change in angle of the wiper, wherein a second control line is provided, it being possible to use this second control line to feed a change-in-angle signal, which is recorded by the second signal transmitter, to the control means.

The invention therefore provides a second signal transmitter which records a change-in-angle signal, that is to say preferably that the measured change in angle has exceeded a threshold value, and feeds said change-in-angle signal to the control means via a second control line. In principle, the threshold value can be predetermined, for example as a mechanical manufacturing tolerance of the signal transmitter. However, according to a preferred embodiment of the invention, provision is made for it to be possible to set the threshold value, and for said threshold value to be, for example, a few percent of the rotation angle of the wiper. In principle, a change in angle can be recorded at any desired position of the wiper. The change in angle of the wiper is very particularly preferably recorded starting from the setpoint position of the wiper, and preferably starting from the park position of the wiper, for example at the lower end or just in front of the lower end of the wiping angle.

A preferred development of the windscreen wiping device involves a transmitter magnet being provided, said transmitter magnet preferably being arranged on the output side of the wiper drive, and the second signal transmitter being designed as a magnetic field-dependent switching element. The magnet-dependent switching element evaluates the magnetic field of the transmitter magnet and generates the change-in-angle signal when the abovementioned threshold value is exceeded.

In principle, the second signal transmitter can be designed as any desired switching element, for example as a Hall sensor, inductive sensor, optical sensor, transistor and/or field-effect transistor. However, according to a preferred development of the invention, the magnetic field-dependent switching element is designed as a reed contact switch. The reed contact switch generates the change-in-angle signal when the abovementioned threshold value is exceeded.

A preferred development of the invention involves the first signal transmitter being designed as a magnetic field-dependent position sensor. The magnetic field-dependent position sensor determines the angular position of the wiper by evaluating the magnetic field of the transmitter magnet and feeds the recorded angular position signal to the control means via the first control line. The magnetic field-dependent position sensor is designed, for example, as a Hall sensor.

A preferred development of the windscreen wiping device also involves the control means being connected to the vehicle battery when the ignition is switched off. In this way, the control means is supplied with power permanently, that is to say, for example in a car wash, when the engine is switched off, and can actuate the wiper via the wiper drive.

The invention also relates to a method for operating a windscreen wiping device, which has at least one wiper, for a motor vehicle, wherein the angular position of the wiper is recorded, characterized in that a change in angle of the wiper is additionally recorded. The change in angle of the wiper relative to one or more predefinable setpoint positions or park positions of the wiper is preferably recorded, wherein the change in angle is recorded only after a predefinable threshold value is exceeded.

A preferred development of the invention involves the angular position of the wiper and the change in angle of the wiper being fed to an electronic control means. Information is preferably fed to the electronic control means by means of electrical signaling via a first and, respectively, a second control line.

The control means very particularly preferably implements self-locking in the inoperative state of the wiper, wherein, in the event of self-locking, a deviation in the angular position of the wiper from the setpoint position of the wiper is compensated for by actuating the wiper drive. In other words, the wiper is rotated from an unconventional position, for example in the event of rotation of the wiper into the field of view, which rotation has an adverse effect on the field of view of the driver, to the setpoint position, for example the park position of the wiper, by actuating the wiper drive.

In principle, the self-locking can be permanent, that is to say can be implemented both when the ignition of the motor vehicle is switched on and when it is switched off. However, according to a preferred exemplary embodiment of the invention, provision is made for the control means to be changed over to a standby state, in particular when the ignition of the motor vehicle is switched off, wherein the power supply to the electrical components of the windscreen wiping device is reduced or switched off in the standby state, the change in angle of the wiper is recorded in the standby state, and self-locking of the wiper is activated when the measured change in angle exceeds a predetermined threshold value. In other words, during the standby state, when a change in angle of the wiper is detected and when the measured change in angle exceeds a predetermined threshold value, the electronic control means is changed over to the monitoring phase and self-locking is implemented. As a result, the current consumption of the self-locking device is reduced, particularly when the ignition of the motor vehicle is switched off.

The above-described windscreen wiping device is preferably used in vehicle engineering, for example in motor-vehicle engineering. Further fields of use include aircraft, boat or rail vehicles.

BRIEF DESCRIPTION OF THE DRAWINGS

The invention will be described in detail below using preferred exemplary embodiments with reference to the drawing, in which.

DETAILED DESCRIPTION

Figure 1:
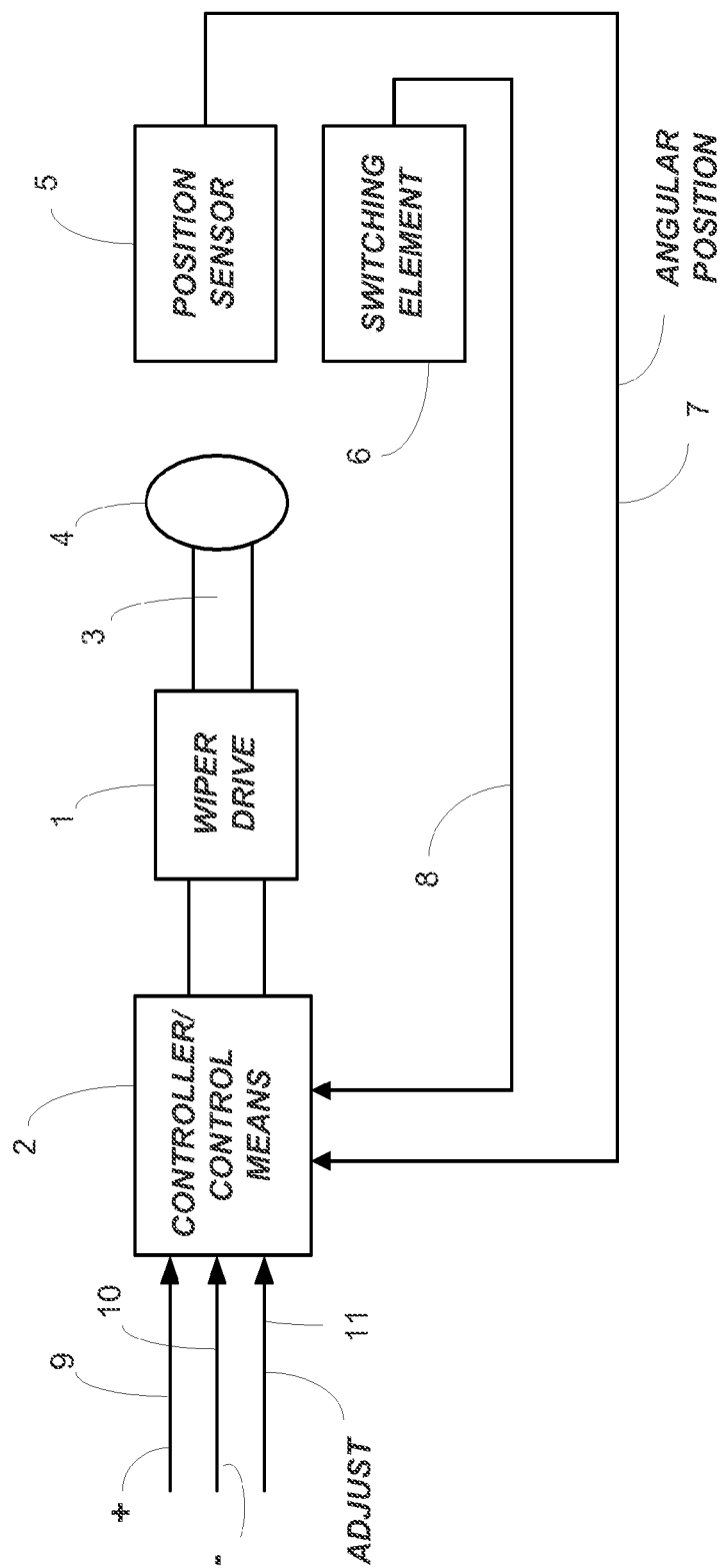
FIG. 1 shows a schematic illustration of a windscreen wiping device according to a preferred exemplary embodiment of the invention, together with its essential functional blocks.

FIG. 1 shows a schematic illustration of a windscreen wiping device according to a preferred exemplary embodiment of the invention. The windscreen wiping device serves to control an electric wiper drive 1 for driving a wiper and has a control means 2. The wiper drive 1 can have a gear mechanism (not illustrated any further). A transmitter magnet 4 is provided such that it is rotationally fixed to the wiper drive 1 by means of an output shaft 3.

A magnetic field-dependent position sensor 5 and a magnetic field-dependent switching element 6 are provided at the setpoint position of the wiper, for example in the park position. The magnetic field-dependent position sensor 5 and the magnetic field-dependent switching element 6 evaluate the magnetic field which is generated by the transmitter magnet 4. According to the currently described exemplary embodiment, the magnetic field-dependent switching element 6 is designed as a reed contact switch.

The magnetic field-dependent position sensor 5 transmits an angular position signal, the actual position signal, to the control means 2 via the first control line 7 of the wiper. If the actual position deviates from the setpoint position of the wiper, the magnetic field-dependent switching element 6 transmits a change-in-angle signal to the control means 2 via the second control line 8. The control means 2 is connected to a power source 9, preferably the battery of the vehicle, and to a ground point 10. Furthermore, provision may be made for the threshold value of the change in position 11 of the maximum wiping angle to be predefined.

When power is supplied to the wiper drive 1, the wiper is pivoted between a lower reversal position and an upper reversal position. Furthermore, an extended park position can be provided, the wiper being in the inoperative state in said park position. The extended park position is preferably implemented beneath or above the lower reversal position.

When the vehicle is moving, the head wind acts on the wiper and pushes it—on account of the inclination of the windscreen—upward. As a result, a torque acts on the output shaft 3. If the wiper drive 1 is not supplied with power, the wiper moves upward since, without mechanical self-locking, a torque which prevents rotation from the start is not active. This effect is undesirable since the wiper moves into the field of view of the driver as a result.

The preconditions required for carrying out the self-locking substantially match the preconditions required for electronic actuation of the wiper drive 1. A microcontroller-controlled electronics system can advantageously be used to record signal inputs, for example LIN bus (Local Interconnect Network), to record the position sensor signals and to actuate a power output stage (for example H-bridge circuit).

For effective electronic self-locking, the wiper drive 1 and the control means 2 are continuously supplied with voltage. To this end, an internally wakeable control means 2 (controller in the standby mode) is used to reduce the power consumption in the inoperative state of the system, that is to say when the ignition is switched off. In this case, part of the control means 2, the wake-up circuit, is supplied with voltage from the vehicle battery, in a manner which is known per se, in the standby mode too, whereas the parts which consume more energy, such as the monitoring means for the angular position signal and the control means, are moved to a standby state.

Figure 2:
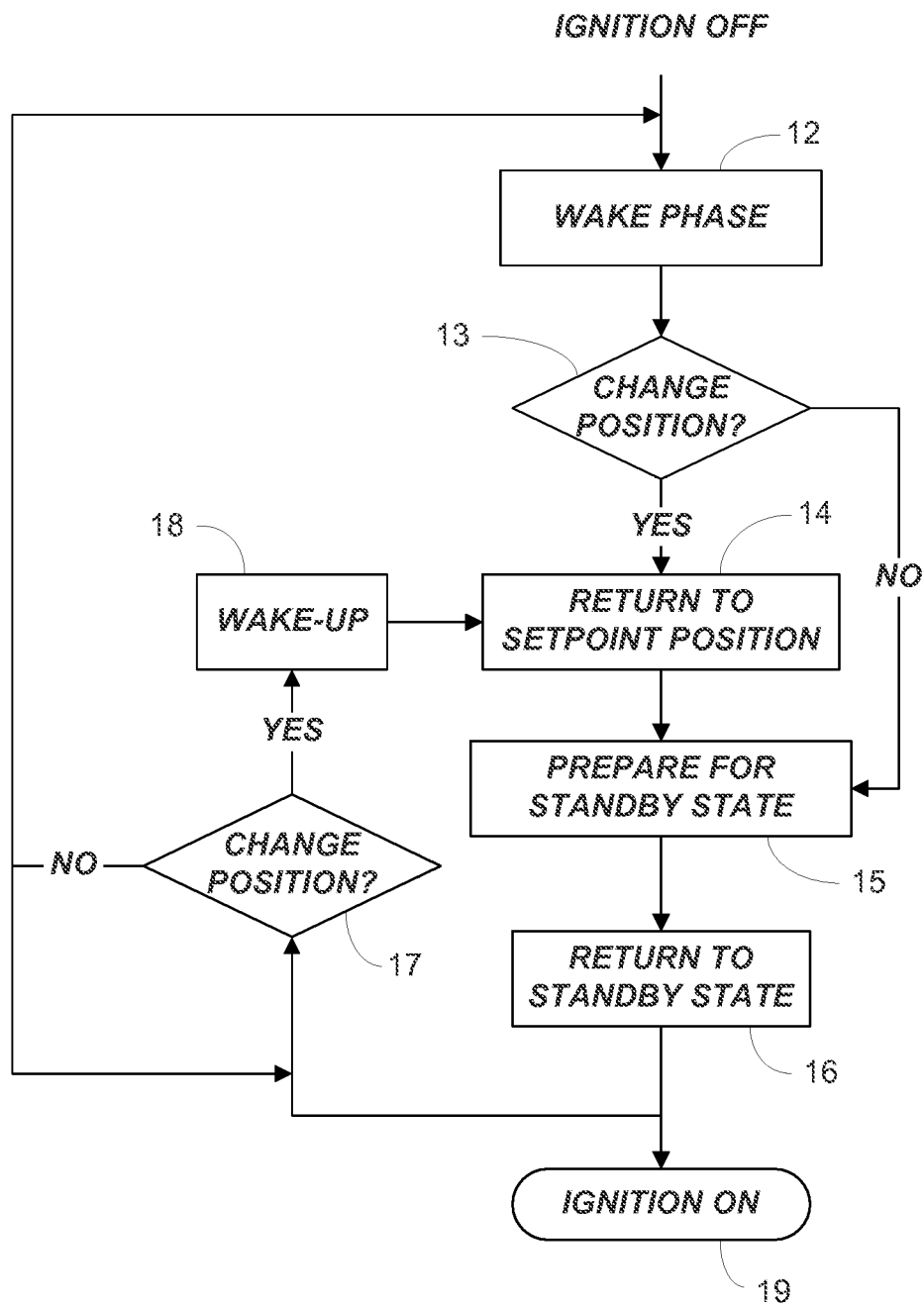
FIG. 2 shows a flowchart for explaining self-locking of the windscreen wiping device when the ignition of the motor vehicle is switched off.

The flowchart which is illustrated in FIG. 2 begins with the ignition of the motor vehicle switched off, and on account of this the electronic control means 2 has been moved to an energy-saving standby state in which essential parts of the control means 2, in particular of the microcontroller, are switched off or moved to a reduced operating state. In accordance with the subsequent program step 12, the control means 2 move to the full operating state by being cyclically internally woken up for the duration of a wake phase by means of the wake-up circuit. The time intervals between the wake phases can be, for example, approximately 1 second.

In accordance with the subsequent program step 13, the control means 2 checks whether there is a change in position, that is to say a change in the wiping angle of the wiper with respect to the setpoint position, in this wake phase which lasts for 10 ms for example. Depending on the result of the position check 13, the program sequence of the electronic self-locking algorithm may branch off.

If a change in position is established, that is to say there is a difference between the angular position and the setpoint position, the wiper is returned to the setpoint position by a position control means which is implemented in the microcontroller. This step 14 virtually constitutes electronic self-locking. Execution of this step 14 can be readily modified by introducing a threshold value, that is to say by prespecifying a minimum change in position. This threshold value for the change in position 11 can be approximately 3% of the maximum wiping angle. After the wiper is returned to the setpoint position, the control means 2 prepares to return to the standby state in the next program step 15. In the following program step 16, the control means 2 assumes the standby state, with the program sequence being cyclically repeated in accordance with the described flowchart until the program sequence is ended by the ignition being switched on. When the ignition 19 is switched on, the wiper is continuously monitored and self-locked since enough energy is available, in contrast to the flowchart according to FIG. 2.

If no change in position is established in program step 13, there is no return operation in accordance with step 14, but rather the changeover to the standby state in accordance with program steps 15 and 16 at the end of the normal wake phase.

Program step 17, in which the magnetic field-dependent switching element 6 continuously checks whether there is a change in movement of the wiper, is triggered in standby state 16. If no change in movement is detected, the cyclical internal wake-up operation according to program step 12 is executed after a predefinable cycle time.

If program step 17 detects a change in movement, the control means 2 is moved to the full operating state by an internal wake-up operation 18, which is performed by means of the wake-up circuit, for the duration of a wake phase. The duration of the wake phase as a result of wake-up by means of program step 18 can vary from the duration of the wake phase as a result of wake-up by means of program step 12. For example, the wake phase as a result of wake-up by means of program step 18 can be performed only for the time which is also actually required to return the wiper to the setpoint position.

The invention claimed is:

1. A windscreen wiping device for a motor vehicle, the device comprising:
   at least one wiper,
   a wiper drive,
   an electronic controller which actuates the wiper drive,
   a first signal transmitter for recording an angular position of the at least one wiper,
   a first control line for feeding an angular position signal, which is recorded by the first signal transmitter, to the controller,
   a second signal transmitter is provided for recording a change in angle of the at least one wiper,
   a second control line for feeding a change-in-angle signal, which is recorded by the second signal transmitter, to the controller, and
   a transmitter magnet, said transmitter magnet being arranged on an output side of the wiper drive, and the second signal transmitter being a magnetic field-dependent switching element.

2. The windscreen wiping device as claimed in claim 1, wherein the magnetic field-dependent switching element comprises a reed contact switch.

3. The windscreen wiping device as claimed in claim 2, wherein the first signal transmitter is a magnetic field-dependent position sensor.

4. The windscreen wiping device as claimed in claim 3, wherein the controller is connected to an vehicle battery when an ignition is switched off.

5. The windscreen wiping device as claimed in claim 1, wherein the first signal transmitter comprises a magnetic field-dependent position sensor.

6. The windscreen wiping device as claimed in claim 1, wherein the controller is connected to a vehicle battery when an ignition is switched off.

7. A method for operating a windscreen wiping device, which has at least one wiper, for a motor vehicle, the method comprising:
   recording an angular position of the wiper;
   recording a change in angle of the wiper; and
   providing the angular position of the wiper and the change in angle of the wiper to an electronic controller, wherein the electronic controller implements self-locking in an inoperative state of the wiper, wherein, in the event of self-locking, a deviation in the angular position of the wiper from a setpoint position of the wiper is compensated for by actuating the wiper drive,
   wherein the controller can be changed over to a standby state, wherein the power supply to the electrical components of the windscreen wiping device is reduced or switched off in the standby state, the change in angle of the wiper is recorded in the standby state, and self-locking of the wiper is activated when the measured change in angle exceeds a predetermined threshold value.

8. The method as claimed in claim 7, wherein the controller is changed over to the standby state when an ignition of the motor vehicle is switched off.

\* \* \* \* \*

UNITED STATES PATENT AND TRADEMARK OFFICE
CERTIFICATE OF CORRECTION

PATENT NO. : 8,581,530 B2  Page 1 of 1
APPLICATION NO. : 12/739029
DATED : November 12, 2013
INVENTOR(S) : Florian Tisch It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 366 days.

Signed and Sealed this
Twenty-second Day of September, 2015

Michelle K. Lee
*Director of the United States Patent and Trademark Office*